(12) United States Patent
Wang et al.

(10) Patent No.: US 11,632,009 B2
(45) Date of Patent: Apr. 18, 2023

(54) BUSBAR ASSEMBLY, MOTOR, ELECTRICAL PRODUCT, AND METHOD FOR MANUFACTURING BUSBAR ASSEMBLY

(71) Applicant: NIDEC CORPORATION, Kyoto (JP)

(72) Inventors: Yu Wang, Dalian (CN); Jun Gao, Dalian (CN); Wenlong Zhang, Dalian (CN)

(73) Assignee: NIDEC CORPORATION, Kyoto (JP)

( * ) Notice: Subject to any disclaimer, the term of this patent is extended or adjusted under 35 U.S.C. 154(b) by 57 days.

(21) Appl. No.: 17/199,384

(22) Filed: Mar. 11, 2021

(65) Prior Publication Data

US 2021/0288544 A1 Sep. 16, 2021

(30) Foreign Application Priority Data

Mar. 13, 2020 (CN) .......................... 202010176324.6

(51) Int. Cl.
| | |
|---|---|
| *H02K 3/50* | (2006.01) |
| *H02K 3/52* | (2006.01) |
| *H02K 3/38* | (2006.01) |
| *H02K 5/04* | (2006.01) |
| *H02K 5/22* | (2006.01) |

(52) U.S. Cl.
CPC ................. *H02K 3/50* (2013.01); *H02K 3/38* (2013.01); *H02K 3/52* (2013.01); *H02K 5/04* (2013.01); *H02K 5/225* (2013.01); *H02K 2203/09* (2013.01)

(58) Field of Classification Search
CPC ........... H02K 3/522; H02K 3/28; H02K 3/50; H02K 5/225; H02K 5/22; H02K 3/52; H02K 15/085; H02K 15/10; H02K 3/38; H02K 5/04; H02K 2203/09
USPC .......................................................... 310/71
See application file for complete search history.

(56) References Cited

U.S. PATENT DOCUMENTS

| | | | | |
|---|---|---|---|---|
| 9,735,639 B2 * | 8/2017 | Shim | ...................... | H02K 3/522 |
| 2008/0242124 A1 * | 10/2008 | Otsuji | .................. | H01R 25/168 |
| | | | | 439/76.2 |
| 2015/0357877 A1 * | 12/2015 | Bessho | ..................... | H02K 3/50 |
| | | | | 310/71 |
| 2021/0143698 A1 * | 5/2021 | Alsman | .................... | H02K 3/50 |

FOREIGN PATENT DOCUMENTS

JP            2009290921       12/2009

* cited by examiner

*Primary Examiner* — Alexander A Singh
(74) *Attorney, Agent, or Firm* — JCIPRNET (57) ABSTRACT

Embodiments of this application provide a busbar assembly, a motor, an electrical product, and a method for manufacturing a busbar assembly. The busbar assembly includes a busbar for conducting electricity and a busbar holder for supporting the busbar. The busbar extends in a circumferential direction, a height of the busbar in an axial direction is greater than a thickness in a radial direction, and the busbar holder is integrally molded with the busbar. The busbar includes a plurality of convex portions extending in the axial direction, and the convex portions are exposed from the busbar holder.

11 Claims, 6 Drawing Sheets

BUSBAR ASSEMBLY, MOTOR, ELECTRICAL PRODUCT, AND METHOD FOR MANUFACTURING BUSBAR ASSEMBLY

CROSS REFERENCE TO RELATED APPLICATIONS

The present invention claims priority under 35 U.S.C. § 119 to China Application No. 202010176324.6 filed on Mar. 13, 2020, the entire content of which is incorporated herein by reference.

FIELD OF THE INVENTION

The disclosure relates to the field of electromechanics.

BACKGROUND

A motor includes a busbar assembly. The busbar assembly includes a busbar holder and at least one busbar for conducting electricity. In some structures of the busbar assembly, the busbar holder is molded by resin casting, and then the busbar is inserted into and disposed in the molded busbar holder. In some other structure, the metal plate is cut to mold an annular busbar. A size of the annular busbar in a radial dimension is smaller than a size in axial dimension, and the annular busbar has a through hole running through the annular busbar in the axial direction. A mold for molding the busbar holder has a columnar component. The columnar component is inserted into the through hole to position and clamp the annular busbar, and resin is injected into the mold to enable that the annular busbar is integrally injection molded with the busbar holder.

It should be noted that, the foregoing description of the technical background is only for ease of describing the technical solutions of the disclosure clearly and completely, and is described for ease of understanding by a person skilled in the art. The foregoing technical solutions cannot be considered as known to a person skilled in the art only because the solutions are described in the background part of the disclosure.

SUMMARY

According to a first aspect of the embodiments of this application, a busbar assembly is provided, including: a busbar for conducting electricity and a busbar holder for supporting the busbar.

The busbar extends in a circumferential direction, a height of the busbar in an axial direction is greater than a thickness in a radial direction, and the busbar holder is integrally molded with the busbar.

Specific implementations of this application are disclosed in detail with reference to the following description and the accompanying drawings, and a manner in which the principle of the disclosure may be used is specified. It should be understood that, the implementations of this application are not limited in scope. The implementations of this application include many changes, modifications, and equivalents within the spirit and term scope of the appended claims.

The above and other elements, features, steps, characteristics and advantages of the present disclosure will become more apparent from the following detailed description of the preferred embodiments with reference to the attached drawings.

BRIEF DESCRIPTION OF THE DRAWINGS

The included accompanying drawings are used for providing further understanding of the embodiments of this application, constitute a part of the specification, and are used to illustrate implementations of this application and explain the principle of this application together with literal descriptions. Obviously, the accompanying drawings described below are only some embodiments of the disclosure, and a person of ordinary skill in the art may obtain other accompanying drawings according to these accompanying drawings without creative efforts. In the accompanying drawings.

DETAILED DESCRIPTION

Referring to the accompanying drawings and through the following specification, the foregoing description and other features of the disclosure became obvious. In this specification and the accompanying drawings, specific embodiments of the disclosure are specifically disclosed, and indicate some embodiments in which the principle of the disclosure may be used. It should be understood that, the disclosure is not limited to the described embodiments. On the contrary, the disclosure includes all modifications, variations and equivalents falling within the scope of the appended claims.

In this embodiment of the present disclosure, the term "and/or" includes any and all combinations of one or more related listed items. The terms such as terms "contain", "have", and "include", specify the existence of the described features, elements, or components, but do not exclude the existence or adding of one or more other features, elements or components.

In this embodiment of the present disclosure, a singular form such as "a" and "the" may include a plural form, which is understood broadly as "a kind" or "a class" instead of limiting to a meaning of "a". In addition, it should be understood that the term "the" includes both the singular form and the plural form, unless the context clearly dictates otherwise. In addition, the term "according to" should be understood as "at least partially according to . . . ", and the term "based on" should be understood as "at least partially based on . . . ", unless the context clearly dictates otherwise.

In addition, in the following description of the disclosure, for ease of description, a direction extending in a central axis (for example, a central axis OO') of the motor or a direction parallel to the central axis is referred to as an "axial direction", and a radial direction centered on the central axis OO' is referred to as a "radial direction". A direction around a central axis OO' is referred to as "circumferential". It should be noted that, these are only for ease of description, and do not limit an orientation of a motor in use and during manufacturing.

The following describes implementations of the embodiments of the disclosure with reference to the accompanying drawings.

An embodiment of a first aspect of this application provides a busbar assembly.

Figure 1:
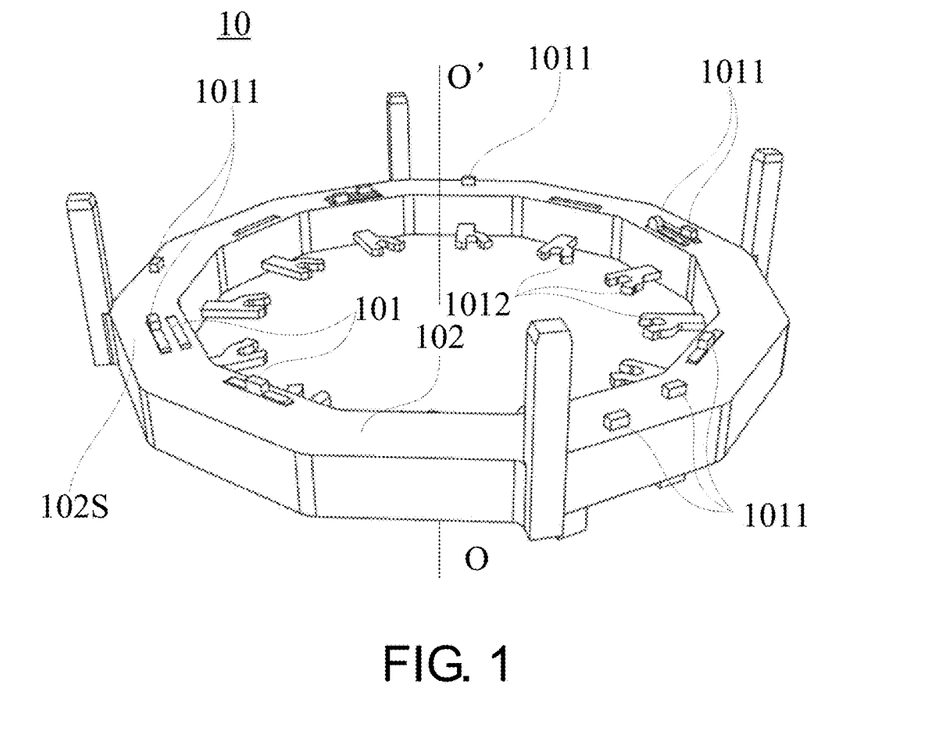
FIG. 1 is a schematic diagram of a busbar assembly according to an exemplary embodiment of a first aspect of this application.
Figure 2:
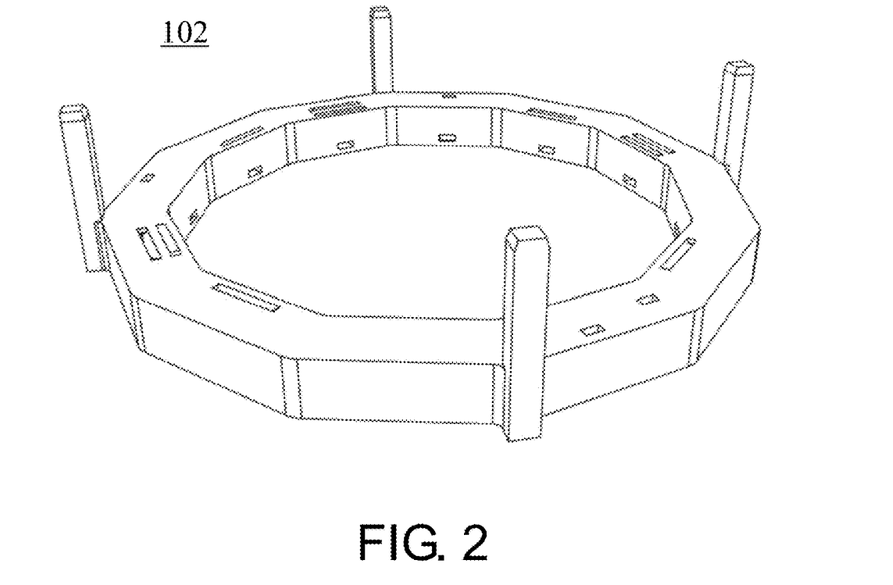
FIG. 2 is a schematic diagram of a busbar holder of the busbar assembly shown in FIG. 1.
Figure 3:
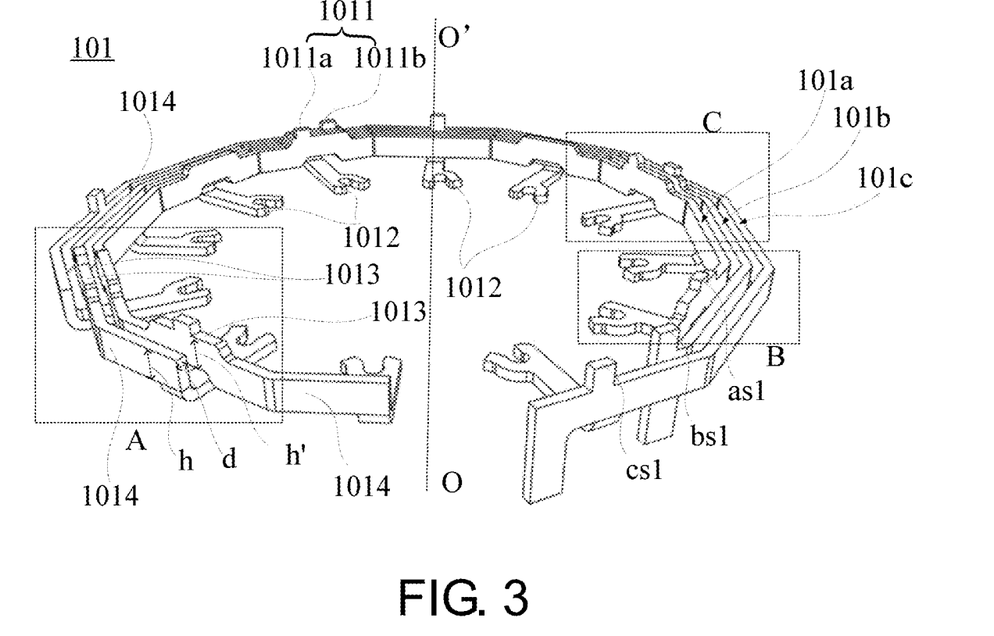
FIG. 3 is a schematic diagram of a busbar of the busbar assembly shown in FIG. 1.
Figure 4:
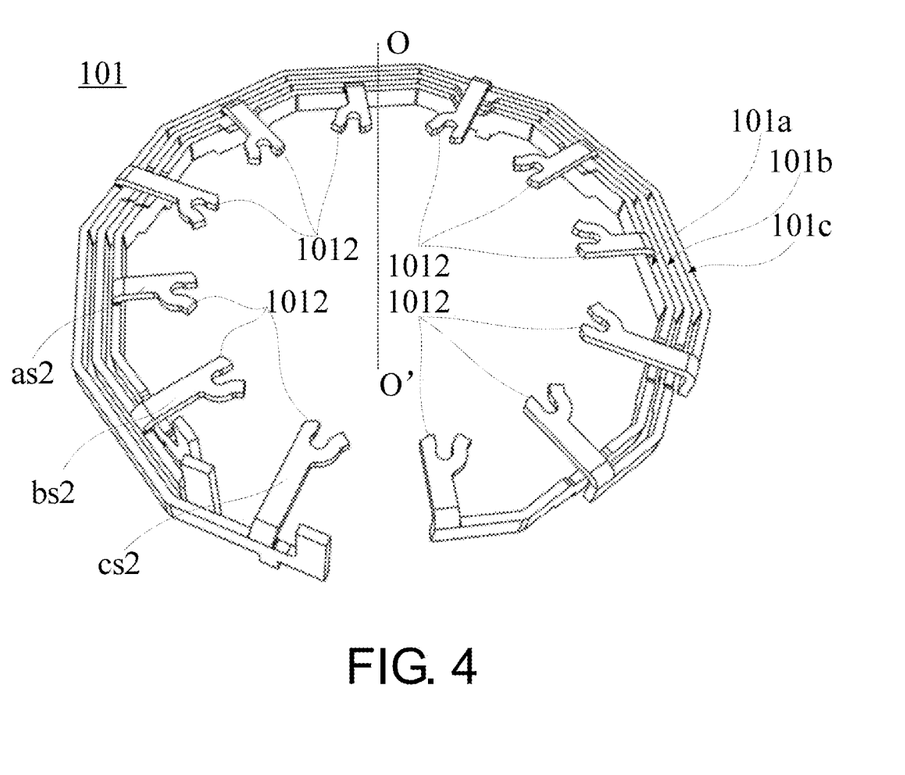
FIG. 4 is a schematic diagram of another direction of the busbar shown in FIG. 3.

FIG. 1 is a schematic diagram of a busbar assembly according to an embodiment of a first aspect of this application. FIG. 2 is a schematic diagram of a busbar holder of the busbar assembly shown in FIG. 1. FIG. 3 is a schematic diagram of a busbar of the busbar assembly shown in FIG. 1, and shows a case of viewing the busbar from one side in an axial direction. FIG. 4 is a schematic diagram of another direction of the busbar shown in FIG. 3, and shows a case of viewing the busbar from the other side in the axial direction.

As shown in FIG. 1, FIG. 2, and FIG. 3, the busbar assembly 10 includes a busbar 101 for conducting electricity and a busbar holder 102 for supporting the busbar 101. The busbar 101 extends in a circumferential direction, a height h of the busbar 101 in an axial direction is greater than a thickness d (shown in FIG. 3) in the radial direction, and the busbar 101 is integrally molded with the busbar holder 102. The busbar 101 includes a plurality of convex portions 1011 extending in the axial direction, and the convex portions 1011 are exposed from the busbar holder 102.

It is understood from the foregoing embodiments that the busbar is integrally molded with the busbar holder, so that a process is saved. The convex portion on the busbar is clamped by using a mold, and when flowing resin is injected into the mold, the position accuracy of the busbar is able to be ensured, the busbar extends in the circumferential direction, and the height in the axial direction is greater than the thickness in the radial direction. A metal plate is cut to define a strip-shaped busbar assembly, and bending processing and roll round processing is performed on the strip-shaped busbar assembly to define a molded busbar. Therefore, utilization of the plate is improved, and costs are reduced.

In one or more embodiments, the busbar assembly 10 includes a plurality of busbars 101, and the plurality of busbars 101 is arranged in the radial direction. The convex portions 1011 of two adjacent busbars 101 in the radial direction are staggered in the circumferential direction. Therefore, it is able to be ensured that a distance between different convex portions 1011 is greater than an air insulation distance, so that sufficient insulation is implemented.

For example, as shown in FIG. 3 and FIG. 4, the busbar assembly 10 includes three busbars 101 arranged in the radial direction. For ease of description, the three busbars are represented by 101a, 101b and 101c respectively, and 101a, 101b, and 101c are located from a radial inner side to an outer side respectively. A convex portion 1011a and a convex portion 1011b of two adjacent busbars 101a and 101b in the radial direction are staggered in the circumferential direction. It should be noted that, FIG. 3 and FIG. 4 are only exemplary descriptions. A quantity of busbars of the busbar assembly 10 may alternatively be other values, such as one, two, and more than four, which is not listed one by one in this application.

In one or more embodiments, as shown in FIG. 1, FIG. 3, and FIG. 4, the busbar assembly 10 includes the three busbars 101a, 101b, and 101c arranged in the radial direction, and each busbar includes a coil connecting portion 1012. The convex portion 1011 is located on one axial side (an O' side) in of the busbar 101, and the coil connecting portion 1012 is located on the other axial side (an O side) of the busbar 101, and end faces on the one axial side and end faces on the other axial side of the busbars 101a, 101b, and 101c have the equal height as end faces on one axial side and end faces on the other axial side of the other busbars in the axial direction respectively. Specifically, as shown in FIG. 3, end faces as1, bs1, and cs1 on the one axial side (the O' side) of the busbars 101a, 101b, and 101c have the equal height in the axial direction. As shown in FIG. 4, end faces as2, bs2, and cs2 on the other axial side (the O side) have the equal height in the axial direction. Therefore, when a plurality of busbars is disposed in the mold for injection molding, positioning is convenient, and the overall axial height of the busbar assembly is reduced. In addition, busbars of the same busbar assembly may have the same shape. Therefore, during molding and assembling, the busbars do not need to be distinguished, and the busbars may be molded using the same device and operation, so that the operation is able to be further simplified. In this application, unless specifically specified, the one axial side is the O' side, and the other axial side is the O side. It should be noted that, FIG. 3 only exemplarily shows that the end faces on the one axial side as1, bs1, and cs1 of the respective convex portions 1011 of the busbars 101a, 101b, and 101c have the equal height in the axial direction. FIG. 4 only exemplarily shows that the end faces on the other axial side as2, bs2, and cs2 of the respective coil connecting portions 1012 of the busbars 101a, 101b, and 101c have the equal height in the axial direction. However, this application is not limited thereto. In this embodiment of this application, that the end faces on the one axial side of the busbars 101a, 101b, and 101c has the equal height in the axial direction refers to the corresponding portions of the busbars, for example, the convex portion 1011, the coil connecting portion 1012, and the main portion 1014 described in the following, and end faces on one axial side of the bridging portion 1013 are separately located in a plane perpendicular to the axial direction OO'. That the end faces on the other axial side of the busbars 101a, 101b, and 101c has the equal height in the axial direction refers to the corresponding portions of the busbars, for example, the convex portion 1011, the coil connecting portion 1012, and the main portion 1014 described in the following, and the end faces on the other axial side of the bridging portion 1013 are separately located on a plane perpendicular to the axial direction OO'.

In one or more embodiments, as shown in FIG. 1, FIG. 3, and FIG. 4, the coil connecting portion 1012 may be a clamping component, configured to clamp a wire end portion leading out from inside of the motor, to implement an electrical connection. However, this application is not limited thereto. The coil connecting portion 1012 may be further connected to the wire end portion by other means, such as winding connection. However, this application is not limited thereto. A person skilled in the art may select according to actual requirements.

In one or more embodiments, as shown in FIG. 3 and FIG. 4, the busbar 101 further includes a main portion 1014 and a bridging portion 1013. The main portion 1014 extends in a circumferential direction, and the coil connecting portion 1012 extends toward a radial inner side relative to the main portion 1014. The bridging portion 1013 is lifted toward the one axial side relative to the main portion 1014 and crosses the coil connecting portion 1012. An axial width (which may also be referred to as the size, the height) h' of the bridging portion 1013 is the same as an axial width (which may also be referred to as the size, the height) h of the main portion 1014, and the main portion 1014 is connected to the bridging portion 1013 in the circumferential direction.

Figure 5:
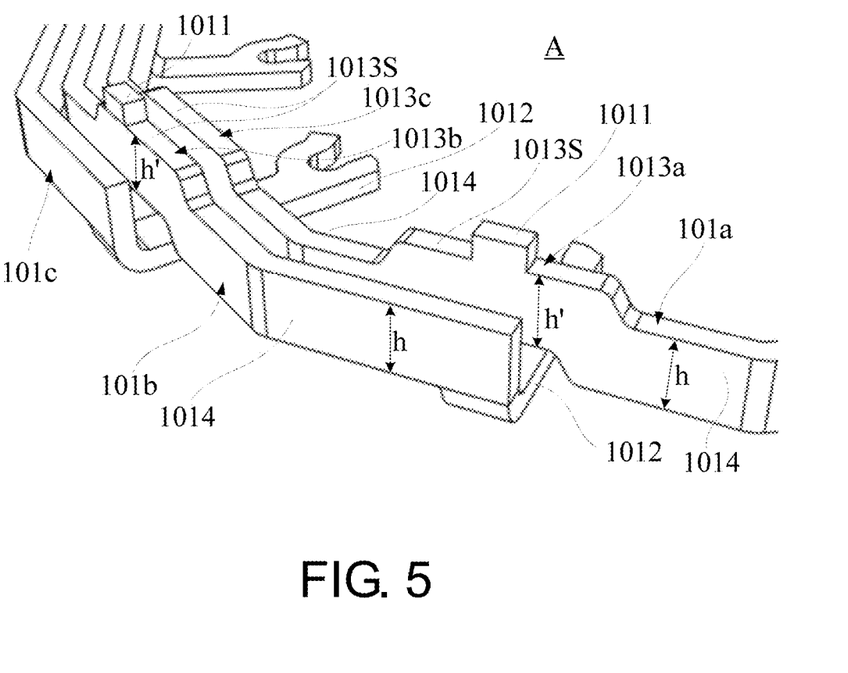
FIG. 5 is an enlarged schematic view of a portion A of the busbar shown in FIG. 3.
Figure 6:
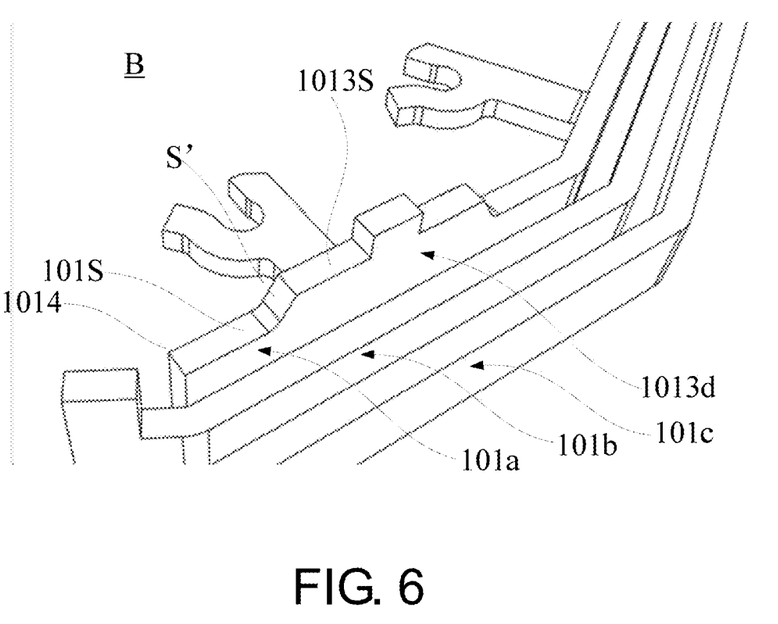
FIG. 6 is an enlarged schematic view of a portion B of the busbar shown in FIG. 3.
Figure 7:
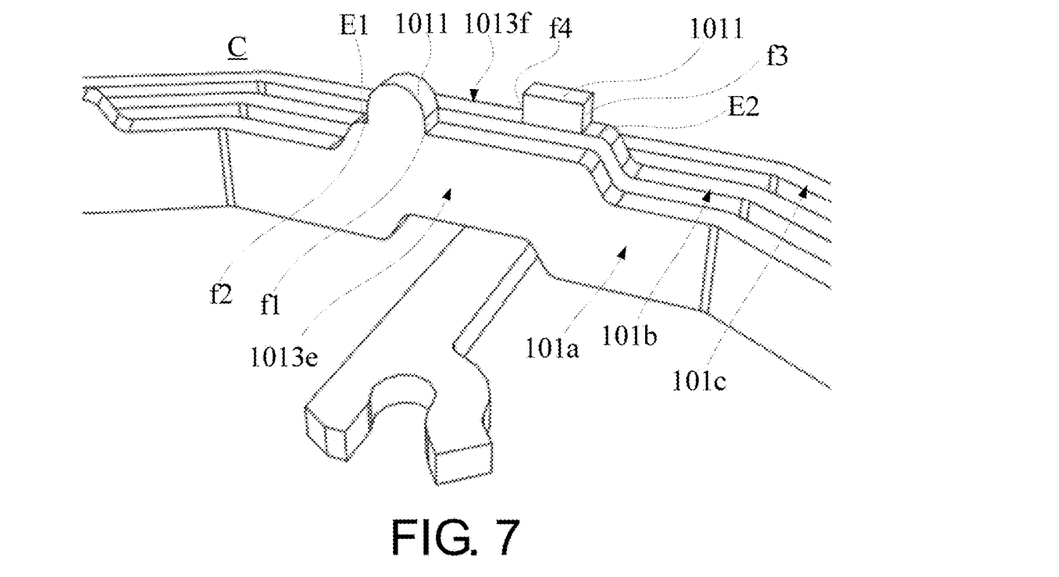
FIG. 7 is an enlarged schematic view of a portion C of the busbar shown in FIG. 3.

FIG. 5, FIG. 6, and FIG. 7 are respectively enlarged schematic views of a portion A, a portion B, and a portion C of the busbar shown in FIG. 3. The related structure of the bridging portion 1013 of the busbar is described below with reference to FIG. 5, FIG. 6, FIG. 7, and FIG. 3. In addition, for ease of description, bridging portions 1013a to 1013f in FIG. 5, FIG. 6 and FIG. 7 represent corresponding bridging portions in FIG. 3 respectively.

In one or more embodiments, as shown in FIG. 5, a busbar 101a located on the one axial side of the coil connecting portion 1012 of the busbar 101b includes the bridging portion 1013a lifted toward the one axial side and crossing the coil connecting portion 1012 of the busbar 101b. The busbar 101a and the busbar 101b that are located on the one axial side of the coil connecting portion 1012 of the busbar 101c include the bridging portion 1013b and the bridging portion 1013c respectively that are lifted toward the one axial side and cross the coil connecting portion 1012 of the busbar 101c. The axial height h' of the bridging portion 1013 (1013a, 1013b, and 1013c) is the same as the axial height h of the main portion 1014 of the busbar, and the main portion 1014 is connected to the bridging portion 1013 in the circumferential direction. Therefore, the current density is constant throughout the circumferential direction of the busbar. In this embodiment of this application, the main portion of the busbar is a non-bridging portion of the busbar. That is, the busbar includes the main portion and the bridging portion in the circumferential direction, and the main portion is connected to the bridging portion. Therefore, the plurality of busbars is regarded as a whole. The whole axial height of the plurality of busbars is reduced, and the current density is unchanged, and is easy for conducting electricity.

In one or more embodiments, a surface 1013S (as shown in FIG. 5) on the one axial side (the O' side) of the bridging portion 1013 is located in the same plane as a surface 102S (as shown in FIG. 1) on the one axial side (the O' side) of the busbar holder 102. Therefore, the surface 1013S on the one axial side of the bridging portion 1013 does not protrude from the surface 102S on the one axial side of the busbar holder 102, and the surface 1013S on the one axial side of the bridging portion 1013 is able to be abutted by using the mold to position the mold. That is, the bridging portion 1013 is able to implement mold positioning, and adjacent bridging portions is able to be insulated from each other in the radial direction by using the resin material of the busbar holder. However, this application is not limited thereto. For example, the surface 1013S on the one axial side of the bridging portion 1013 may be farther from the axial direction θ' relative to the surface 102S on the one axial side of the busbar holder 102. In addition, in a case that the surface 1013S on the one axial side of the bridging portion 1013 protrudes from the surface 102S on the one axial side of the busbar holder 102, a glue site (a resin portion) may be provided around the bridging portion, so that the surface on the one axial side of the glue site is in the same plane as the surface 1013S on the one axial side of the bridging portion 1013. However, this application is not limited thereto. A person skilled in the art may set according to actual requirements.

In one or more embodiments, as shown in FIG. 6, the busbar 101 includes a connecting surface S'. The connecting surface S' connects the surface 1013S of the one axial side of the bridging portion 1013d with the surface 101S of the one axial side of the main portion 1014 of the busbar, and a joint of the connecting surface S' and the surface 1013S on the one axial side of the bridging portion is a corner angle. In other words, the joint of the connecting surface S' and the surface 1013S on the one side of the bridging portion is of a non-chamfered structure, or is referred to as a non-R-shaped structure. Therefore, it is able to prevent the resin from flowing between the mold and the surface 1013S on the one axial side of the bridging portion during molding the busbar holder to generate burrs, and injection molding is easily performed. In this embodiment of this application, it is possible that the connecting structure of a portion of the connecting surface and the surface on the one axial side of the bridging portion is a non-chamfered structure. Preferably, the connecting structure of all of the connecting surface and the surface on the one axial side of the bridging portion is a non-chamfered structure. However, this application is not limited thereto. A person skilled in the art may set according to actual requirements.

In one or more embodiments, at least one of two adjacent bridging portions in the radial direction is provided with the convex portion. For example, as shown in FIG. 5, the bridging portion 1013c of two adjacent bridging portions 1013b and 1013c in the radial direction is provided with a convex portion 1011. However, this is not limited thereto. The convex portion may be further disposed in the bridging portion 1013b. In addition, as shown in FIG. 7, convex portions 1011 may also be disposed in both adjacent bridging portions 1013e and 1013f in the radial direction. Therefore, the axial lift of the bridging portion is used for abutting against the mold, so that the convex portion 1011 is conveniently provided, and support of the convex portion 1011 is more reliable. However, this application is not limited thereto. The convex portion 1011 may also be disposed on the main portion of the busbar instead of the bridging portion. This application is not limited thereto, and a person skilled in the art may set according to actual requirements.

In one or more embodiments, as shown in FIG. 7, the two adjacent bridging portions 1013e and 1013f in the radial direction are provided with one convex portion 1011, and two convex portions are located at two sides of the bridging portions 1013e and 1013f in the circumferential direction respectively and are spaced a preset distance apart from end portions disposing on the convex portions. That is, the convex portion 1011 on the bridging portion 1013e is disposed in a position close to one end E1 of the bridging portion 1013e, and the convex portion 1011 is spaced a preset distance apart from the one end E1. The convex portion 1011 on the bridging portion 1013f is disposed in a position close to the other end E2 of the bridging portion 1013f, and the convex portion 1001 is spaced a preset distance apart from the other end E2. Therefore, it is able to be ensured that a separation distance between the convex portion 1011 on the bridging portion 1013e and the convex portion 1011 on the bridging portion 1013f is greater than an air insulation distance, so as to sufficiently insulate. In addition, the convex portion 1011 is spaced a preset distance apart from the end portion of the bridging portion, and the mold for clamping the convex portion 1011 is able to easily clamp the convex portion 1011 to easily mold the busbar assembly.

In one or more embodiments, as shown in FIG. 3, FIG. 5, FIG. 6, and FIG. 7, planar portions are provided on two sides opposite in the circumferential direction of the convex portion 1011. For example, FIG. 7 shows that a planar portion f1 is provided on one circumferential side of the convex portion 1011 disposed on the bridging portion 1013e, a planar portion f2 is provided on the other opposite side, a planar portion f3 is provided on one circumferential side of the convex portion 1011 disposed on the bridging portion 1013f, and a planar portion f4 is provided on the other opposite side. In this way, the mold is able to reliably clamp the convex portion, and molding of the busbar assembly is facilitated.

According to the foregoing embodiment, the busbar is integrally molded with the busbar holder, so that a process is reduced. The convex portion on the busbar is clamped by using the mold, and when flowable resin is injected into the mold, the position precision of the busbar is ensured. The busbar extends in the circumferential direction, and the height in the axial direction is greater than the thickness in the radial direction. A metal plate may be cut to mold a strip-shaped or substantially strip-shape busbar assembly, and bending processing and roll round processing are performed on the strip-shaped busbar assembly to mold a molded busbar. Therefore, utilization of the plate is improved, and costs are reduced.

An embodiment of a second aspect of this application provides a motor, including the busbar assembly according to the embodiment of the first aspect. Because the structure of the busbar has been described in detail in the embodiment of the first aspect, the content of the busbar is merged herein. Descriptions are omitted herein.

Figure 8:
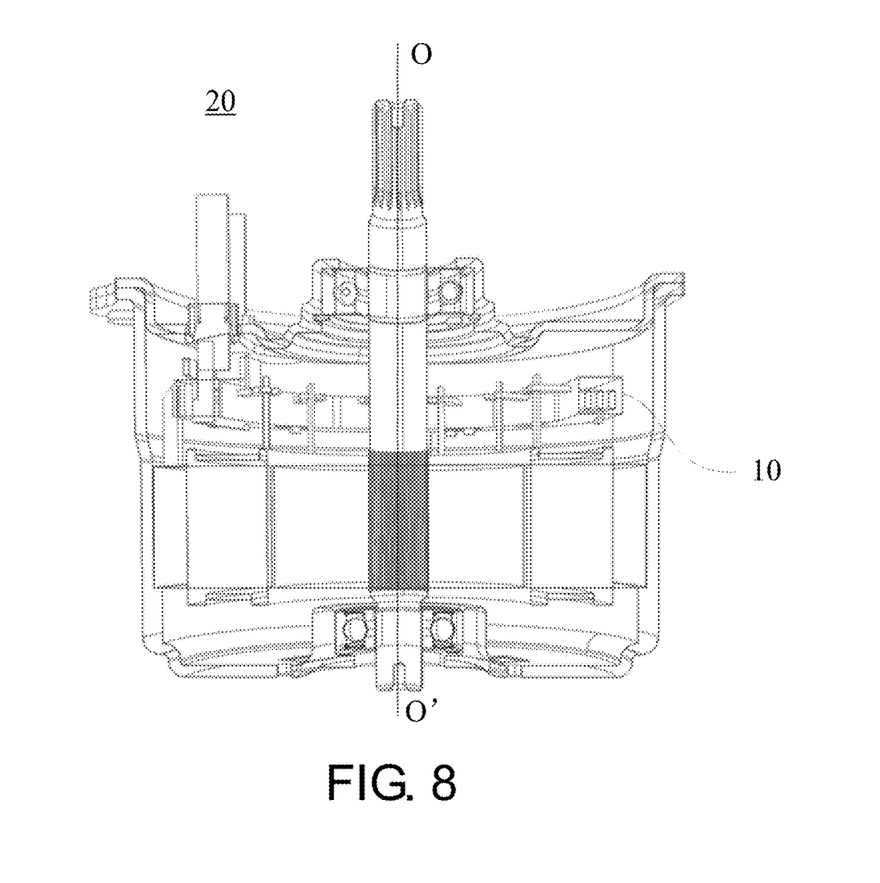
FIG. 8 is a cross-sectional view of a motor according to an exemplary embodiment of a second aspect of this application.

In this embodiment of this application, the motor may be any motor. FIG. 8 is a sectional view of a motor according to an embodiment of a second aspect of this application. As shown in FIG. 8, the motor 20 includes the busbar assembly 10. In addition, the motor 20 further includes a rotating shaft, a rotor, and a stator. In addition, the motor 20 may further include other components such as a bearing and a housing. Reference may be made to the related art, and descriptions are omitted herein.

According to this embodiment of this application, the busbar assembly of the motor includes a busbar and a busbar holder. The busbar is integrally molded with the busbar holder, so that a process is reduced. The convex portion on the busbar is clamped by using a mold, and when flowable resin is injected into the mold, the position precision of the busbar is able to be ensured. The busbar extends in the circumferential direction, and the height in the axial direction is greater than the thickness in the radial direction. A metal plate may be cut to mold a strip-shaped or a substantially strip-shaped busbar assembly, and bending processing and roll round processing are performed on the strip-shaped busbar assembly to mold a molded busbar. Therefore, utilization of the plate is improved, and costs are reduced.

An embodiment of a third aspect of this application provides an electrical product, including the motor 20 according to the embodiment of the second aspect. Because the structure of the motor 20 has been described in detail in the embodiments of the first aspect and the second aspect, the content of the motor is merged herein. Descriptions are omitted herein.

In this embodiment of this application, the electrical product may be any electrical product using a motor, for example, may be a device or an assembly including a motor, such as any vehicle-mounted device, a household appliance, an office automation device, an industrial device, a transportation device or a component of the device.

According to this embodiment of this application, the motor of the electric product includes a busbar assembly. The busbar assembly includes a busbar and a busbar holder. The busbar is integrally molded with the busbar holder, so that the process is saved. The convex portion on the busbar is clamped by using a mold, and when flowable resin is injected into the mold, the position accuracy of the busbar is able to be ensured. The busbar extends in the circumferential direction, and the height in the axial direction is greater than the thickness in the radial direction. A metal plate may be cut to mold a strip-shaped busbar assembly, and bending processing and roll round processing are performed on the strip-shaped busbar assembly to mold a molded busbar. Therefore, utilization of the plate is improved, and costs are reduced.

An embodiment of a fourth aspect of this application provides a method for manufacturing a busbar assembly, for manufacturing the busbar assembly according to the embodiment of the first aspect. Because the structure of the busbar assembly has been described in detail in the embodiment of the first aspect, the content of the busbar assembly is merged herein. Descriptions are omitted herein.

Figure 9:
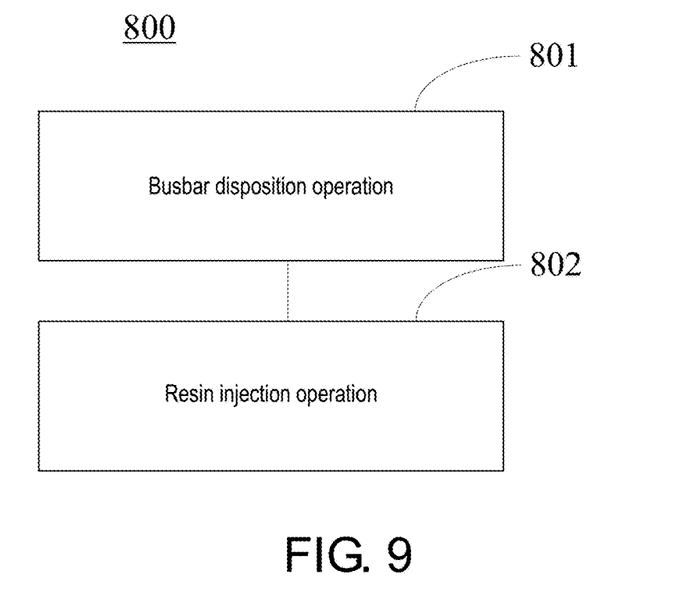
FIG. 9 is a schematic diagram of a method for manufacturing a busbar assembly according to an exemplary embodiment of a fourth aspect of this application.

FIG. 9 is a schematic diagram of a method 800 for manufacturing a busbar assembly according to an embodiment of a fourth aspect of this application. As shown in FIG. 9, the method for manufacturing a busbar assembly may include the following operations:

a busbar disposition operation 801: disposing the busbar in an accommodating portion of a mold, and clamping, by using a clamping portion, a convex portion extending in an axial direction of the busbar to fix the busbar, where the busbar extends in a circumferential direction in the mold, and a height of the busbar in the axial direction is greater than a thickness in the radial direction; and a resin injection operation 802: flowing resin into the accommodating portion and wrapping the busbar, where a busbar holder is formed after the resin is cooled, and the convex portion is exposed from the busbar holder.

Figure 10:
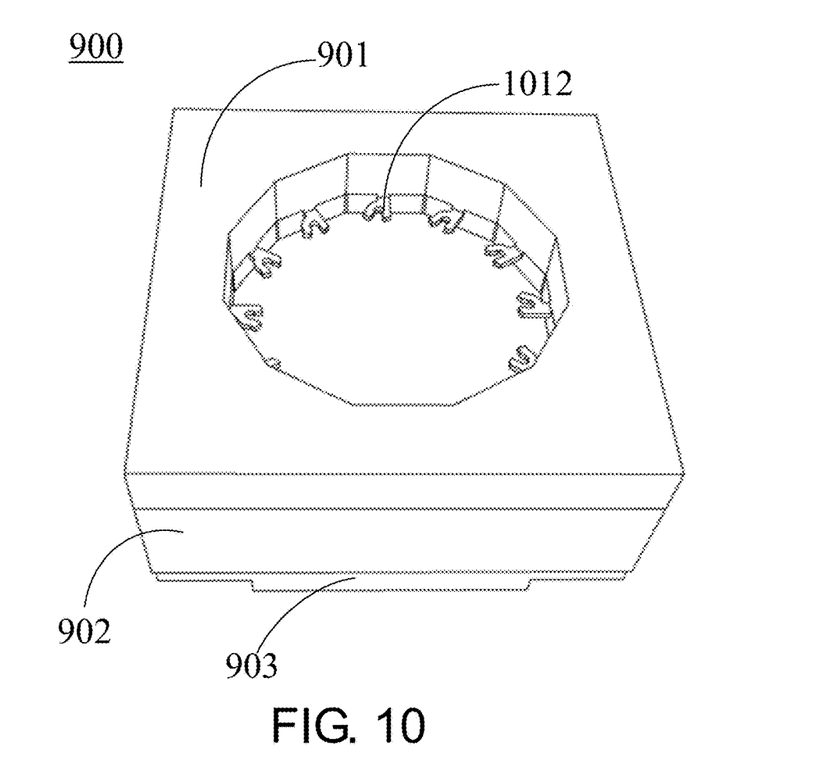
FIG. 10 is a schematic diagram of a mold for molding a busbar assembly according to an exemplary embodiment of a fourth aspect of this application.
Figure 11:
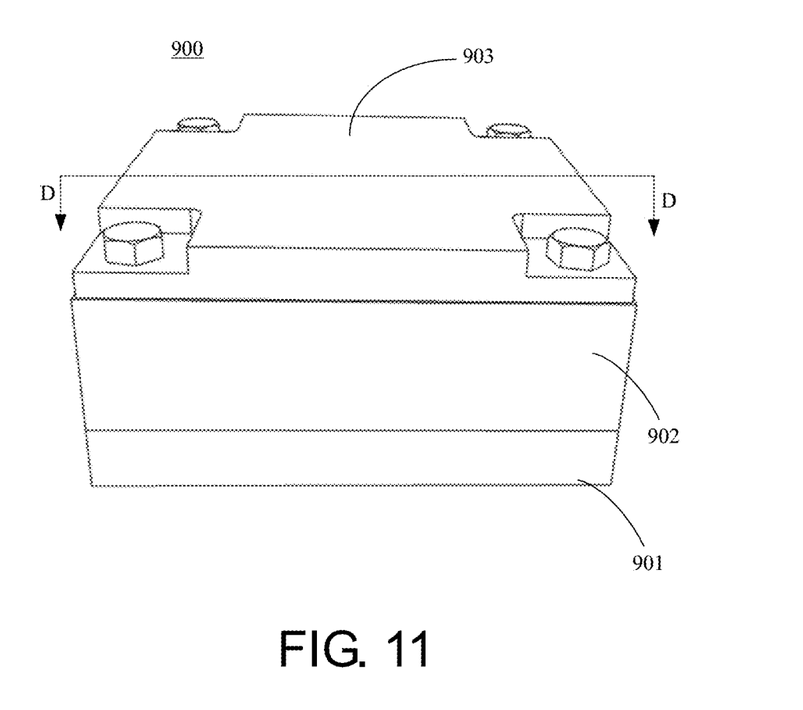
FIG. 11 is another schematic diagram of the mold shown in FIG. 10.
Figure 12:
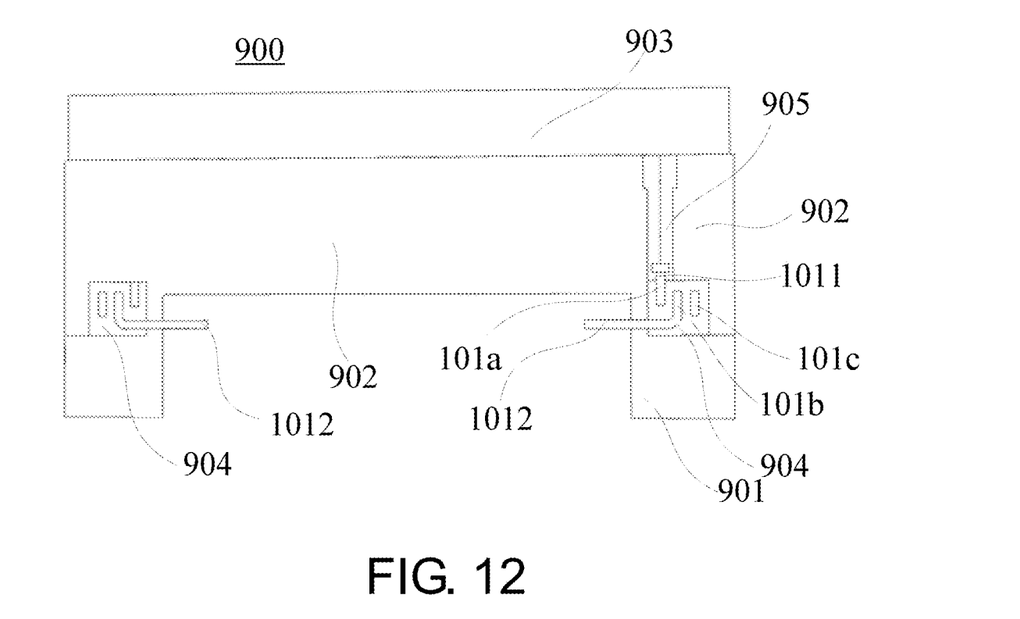
FIG. 12 is a cross sectional schematic view of splitting the mold in a DD direction shown in FIG. 11.

FIG. 10 is a schematic diagram of a mold 900 for molding a busbar assembly according to an embodiment of a fourth aspect of this application. FIG. 11 is another schematic diagram of the mold 900 shown in FIG. 10. FIG. 12 is a cross sectional schematic view of splitting the mold 900 in a DD direction shown in FIG. 11.

In one or more embodiments, as shown in FIG. 10, FIG. 11, and FIG. 12, the mold includes a first mold 901 and a second mold 902. An accommodating portion 904 is defined between the first mold 901 and the second mold 902. The busbars 101a, 101b, and 101c are arranged and disposed in the accommodating portion 904 in the radial direction. In addition, the mold further includes a clamping portion 905. The clamping portion is configured to clamp the convex portion 1011 of the busbar to fix the busbar, and a height of the busbars 101a, 101b, and 101c in the axial direction is greater than a thickness in the radial direction. That is, the busbars 101a, 101b and 101c are disposed in the mold in a longitudinal manner, and resin flows into the accommodating portion 904 and wraps the busbars 101a, 101b and 101c. A busbar holder is formed after the resin is cooled, and the convex portion 1011 is exposed from the busbar holder. Therefore, the busbar is able to be integrally molded with the busbar holder.

In one or more embodiments, as shown in FIG. 10, FIG. 11 and FIG. 12, the clamping portion 905 is disposed in through hole extending in the axial direction of the second mold 902. One end of the clamping portion 905 clamps the convex portion 1011 of the busbar, and the other end of the clamping portion 905 is in contact with the third mold 903 disposed on an end surface of the second mold to fix. Therefore, the convex portion 1011 is able to be clamped by using the clamping portion 905.

In one or more embodiments, before the busbar is clamped by using the mold 900 to mold the busbar assembly, a busbar molding operation may be further included. For example, the metal plate is cut to mold a strip-shaped or substantially strip-shaped busbar component, and bending processing (a bending operation is performed on the coil connecting component of the busbar to mold the coil connecting portion) and roll round processing are performed on the strip-shaped busbar component to mold the busbar. The molded busbar extends in the circumferential direction, and when the busbar assembly is molded, the axial height of the busbar is greater than the radial thickness to integrally mold the busbar holder.

According to this embodiment, the busbar is integrally molded with the busbar holder, so that the process is reduced. The convex portion on the busbar is clamped by using a mold, and when flowable resin is injected into the mold, the position precision of the busbar is able to be ensured. In addition, utilization of the plate is improved, and the costs are reduced.

It should be noted that, the foregoing only exemplarily describes this application. However, this application is not limited thereto. Appropriate variations may be further made based on the foregoing implementations. In addition, the foregoing only exemplarily describes the components and the method for manufacturing the busbar assembly. However, this application is not limited thereto. The specific content of the components may further refer to the related art. In addition, components not shown in FIG. 1 to FIG. 8 and FIG. 10 to FIG. 12 may be further added, or one or more components in FIG. 1 to FIG. 8 and FIG. 10 to FIG. 12 may be reduced.

The foregoing describes this application with reference to the specific implementations, but a person skilled in the art should be understood that, the descriptions are all exemplary, and are not intended to limit the scope of this application. A person skilled in the art may make various variations and modifications to this application according to the principle of this application, and these variations and modifications are also within the scope of this application.

Exemplary embodiments of this application are described above with reference to the accompanying drawings. Many features and advantages of the implementations are clear according to the detailed description. Therefore, the appended claims aim to cover all the features and advantages of the implementations that fall within the true spirit and scope thereof. In addition, because many modifications and changes easily occur to a person skilled in the art, it is not intended to limit the implementations of this application to the exemplary and described precise structure and operation, but to cover all suitable modifications and equivalents falling within the scope thereof.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

What is claimed is:

1. A busbar assembly, comprising a busbar for conducting electricity and a busbar holder for supporting the busbar, wherein
the busbar extends in a circumferential direction, a height of the busbar in an axial direction is greater than a thickness in a radial direction, and the busbar holder is integrally molded with the busbar; and
the busbar comprises a plurality of convex portions extending in the axial direction, and the convex portions are exposed from the busbar holder;
wherein
the busbar assembly comprises a plurality of busbars, the busbars comprise coil connecting portions, the convex portions are located on one axial side of the busbars, and the coil connecting portions are located on the other axial side of the busbars; and
end faces on the one axial side and the other axial side of the busbars have equal height as end faces on axial side and the other axial side of the other busbars in the axial direction respectively.

2. The busbar assembly according to claim 1, wherein
the busbar assembly comprises a plurality of busbars, the plurality of busbars is arranged in the radial direction, and the convex portions of two adjacent busbars in the radial direction are staggered in the circumferential direction.

3. The busbar assembly according to claim 1, wherein
the busbar further comprises:
a main portion, extending in a circumferential direction, wherein the coil connecting portion extends toward a radial inner side relative to the main portion; and
a bridging portion, lifted toward the one axial side relative to the main portion and crossing the coil connecting portion, wherein an axial width of the bridging portion is a same as an axial width of the main portion, and the main portion is connected to the bridging portion in the circumferential direction.

4. The busbar assembly according to claim 3, wherein
a surface of one axial side of the bridging portion is in a same plane as a surface of one axial side of the busbar holder.

5. The busbar assembly according to claim 4, wherein
the busbar comprises a connecting surface, the connecting surface connects the surface of the one axial side of the bridging portion with the surface of the one axial side of the main portion of the busbar, and a joint of the connecting surface and the surface on the one axial side of the bridging portion is a corner angle.

6. The busbar assembly according to claim 3, wherein
at least one of two adjacent bridging portions in the radial direction is provided with the convex portion.

7. The busbar assembly according to claim 6, wherein
each of the two adjacent bridging portions in the radial direction is provided with one convex portion, and two convex portions are located on two sides of the bridging portions in the circumferential direction respectively and are spaced a preset distance apart from end portions disposing on the convex portions.

8. The busbar assembly according to claim 1, wherein
planar portions are provided on two sides opposite in the circumferential direction of the convex portion.

9. A motor, comprising the busbar assembly according to claim 1.

10. An electrical product, comprising the motor according to claim 9.

11. A method for manufacturing a busbar assembly, wherein the busbar assembly comprises a busbar for conducting electricity and a busbar holder for supporting the busbar, and the manufacturing method comprises:

disposing the busbar in an accommodating portion of a mold, and clamping, by using a clamping portion, a convex portion extending in an axial direction of the busbar to fix the busbar, wherein the busbar extends in a circumferential direction in the mold, and a height of the busbar in the axial direction is greater than a thickness in a radial direction; and flowing resin into the accommodating portion and wrapping the busbar, wherein the busbar holder is formed after the resin is cooled, and the convex portion is exposed from the busbar holder.

* * * * *